(12) United States Patent
Sweeney

(10) Patent No.: US 9,576,504 B2
(45) Date of Patent: Feb. 21, 2017

(54) MECHANICAL MODEL OF THE CARDIOVASCULAR SYSTEM AND METHOD OF DEMONSTRATING THE PHYSIOLOGY OF THE CARDIOVASCULAR SYSTEM

(75) Inventor: Terrence E. Sweeney, Clarks Summit, PA (US)

(73) Assignee: University of Scranton, Scranton, PA (US)

( * ) Notice: Subject to any disclaimer, the term of this patent is extended or adjusted under 35 U.S.C. 154(b) by 1103 days.

(21) Appl. No.: 12/939,741

(22) Filed: Nov. 4, 2010

(65) Prior Publication Data

US 2011/0104651 A1 May 5, 2011

Related U.S. Application Data

(60) Provisional application No. 61/257,932, filed on Nov. 4, 2009.

(51) Int. Cl.
G09B 23/30 (2006.01)
G09B 23/32 (2006.01)
G09B 23/12 (2006.01)

(52) U.S. Cl.
CPC .............. *G09B 23/32* (2013.01); *G09B 23/12* (2013.01)

(58) Field of Classification Search
CPC ..................................................... G09B 23/00
USPC ......................................................... 434/268
See application file for complete search history.

(56) References Cited

U.S. PATENT DOCUMENTS

| | | | | |
|---|---|---|---|---|
| 2,556,043 A | * | 6/1951 | Roucka | 434/268 |
| 2,871,579 A | * | 2/1959 | Nuranen et al. | 434/268 |
| 3,376,660 A | * | 4/1968 | McGinnis | 434/268 |
| 3,631,607 A | * | 1/1972 | Kolff et al. | 73/168 |
| 3,639,084 A | * | 2/1972 | Goldhaber | A01N 1/02 128/897 |
| 3,673,705 A | * | 7/1972 | Wright et al. | 434/126 |
| 3,877,843 A | * | 4/1975 | Fischel | 417/394 |

(Continued)

*Primary Examiner* — Sam Yao
*Assistant Examiner* — Alvin Carlos
(74) *Attorney, Agent, or Firm* — Stradley Ronon Stevens & Young LLP

(57) ABSTRACT

A hydraulic model of the cardiovascular system for illustrating a plurality of physiological concepts and relationships including arterial compliance, venous compliance, and peripheral resistance, said model comprising: a.) a cardiac subsystem for moving a fluid in a singular direction in a closed hydraulic system; b.) an arterial subsystem for modeling arterial compliance, the arterial subsystem fluidically coupled with the cardiac subsystem to receive the fluid discharged from the cardiac subsystem; c.) a peripheral resistance subsystem for modeling peripheral resistance, the peripheral resistance subsystem fluidically coupled with the arterial subsystem to receive the fluid discharged from arterial subsystem; d.) a peripheral venous (PV) subsystem for modeling peripheral venous compliance and for modeling a peripheral venous pump (PVP), the peripheral venous subsystem fluidically coupled with the peripheral resistance subsystem to receive the fluid discharged from the at least one downstream conduit; and e.) a central venous (CV) subsystem for modeling central venous compliance and for modeling a thoracic pump (TP), the CV subsystem fluidically coupled with the PV subsystem to receive the fluid discharged from the PV subsystem and to pass the fluid to the cardiac subsystem to complete the cardiovascular cycle.

19 Claims, 8 Drawing Sheets

(56) References Cited

U.S. PATENT DOCUMENTS

| | | | |
|---|---|---|---|
| 4,014,318 A * | 3/1977 | Dockum et al. | 600/16 |
| 4,464,123 A * | 8/1984 | Glover et al. | 434/268 |
| 4,465,063 A * | 8/1984 | Nielsen et al. | 600/16 |
| 5,016,466 A * | 5/1991 | Ness et al. | 73/1.64 |
| 5,141,847 A * | 8/1992 | Sugimachi | A01N 1/02 137/624.13 |
| 5,158,461 A * | 10/1992 | Sulway | 434/268 |
| 5,632,623 A * | 5/1997 | Kolff et al. | 434/272 |
| 6,205,871 B1 * | 3/2001 | Saloner et al. | 73/866.4 |
| 6,517,354 B1 * | 2/2003 | Levy | 434/262 |
| 6,843,145 B2 * | 1/2005 | Jaszczak et al. | 73/866.4 |
| 2007/0054256 A1 * | 3/2007 | Low et al. | 434/268 |
| 2008/0138778 A1 * | 6/2008 | Eggert et al. | 434/262 |

\* cited by examiner

MECHANICAL MODEL OF THE CARDIOVASCULAR SYSTEM AND METHOD OF DEMONSTRATING THE PHYSIOLOGY OF THE CARDIOVASCULAR SYSTEM

CROSS REFERENCE TO RELATED APPLICATIONS

This application claims priority to U.S. provisional application Ser. No. 61/257,932 filed on Nov. 4, 2009, and is incorporated by reference as if set forth entirely herein.

BACKGROUND OF INVENTION a. Field of Invention

The invention relates generally to anatomical modeling. Particularly, the invention relates to a mechanical model of the cardiovascular system for demonstrating physiological principles related to the cardiovascular system including arterial compliance, venous compliance, arterial resistance, the various effects of ventricular filling pressure and filling time on cardiac stroke volume, hypertension and exercise.

b. Background of the Invention and Description of Related Art

The cardiovascular system is basically a pressure driven transport system, moving its constituents macroscopic distances within an organism, coupled to diffusional transport systems that move constituents microscopic distances. The invention focuses on the convective, macroscopic elements of the cardiovascular system. The fluid, blood, is pressurized in the heart and then moves along a pressure gradient to the tissues throughout the body. Blood pressure and blood flow cycle according the cardiac cycle, diastole to systole. Systole is the contraction phase of the cycle in which blood is pressurized and then ejected. Diastole is the relaxation phase in which the ventricle is filled.

Otto Frank, a scientist who contributed greatly to early twentieth century cardiovascular research, was trained in physics and mathematics. His work on ventricular contraction, manometry, and arterial physiology was pivotal to the discipline and his principles were applied in the inventive model. This is discussed in a paper authored by Nichols, W. W. and O'Rourke, M. F. *McDonald's Blood Flow in Arteries*, London: Arnold, 1998.

Q is a measure of flow, the movement of blood through a given cross-sectional area, and it is referred to as cardiac output (CO). The fundamental purpose of the cardiovascular system is generating and controlling flow, and therefore the purpose of the inventive model is to engineer a model that can generate and control flow.

Darcy, a French engineer, expressed the relationship between pressure, flow, and resistance:

$$Q(\text{flow}) = \frac{\Delta P \text{ (Pressure)}}{R \text{ (Resistance)}} \quad \text{(Eq. 1)}$$

Poiseuille's law expresses the relationship between flow resistance and the geometry of the vessel. This law applies when flow is laminar in uniform vessels.

$$\Delta P/F = R = 8\eta l/\pi r^4 \quad \text{(Eq. 2)}$$

Where, r=vessel radius, l=vessel length, η=relative viscosity, P=pressure, and R=resistance. Clearly the impact of any change in radius will greatly affect resistance and thereby flow. Levick, Rodney. *An Introduction to Cardiovascular Physiology*. 4th. New York: Oxford University Press, 2003. Poiseuille's law is utilized in studying peripheral vascular flow but can be inaccurate because of the largely non-Newtonian behavior of blood in the smaller vessels. Vascular resistance is also affected by the arrangement of the resistance vessels. The following equations can account for these relationships:

$$R_{total} = R_1 + R_2 + R_3 \ldots \text{ (Series)} \quad \text{(Eq. 3)}$$

$$1/R_{total} = 1/R_1 + 1/R_2 + 1/R_3 \ldots \text{ (Parallel)}. \quad \text{(Eq. 4)}$$

$R_1$, $R_2$, $R_3$, being resistors in series and the resistance in the aorta, peripheral arteries and arterioles. The sum of resistance in the entire systemic circulation is the Total Peripheral Resistance, $R_{total}$. Westerhof, Nicolaas. And R. M. Huisman "Arterial haemodynamics of hypertension." *Clinical Science* 72 (1987): 391-398.

Blood vessel radius is clearly a crucial regulating factor for total peripheral resistance and thereby blood pressure. Vessel radius is controlled by a number of factors. The local factors include: myogenic response, paracrine factors (NO and metabolites) and physical factors including temperature and pressure. Extrinsic factors also regulate through vasodilator nerves, sympathetic vasoconstrictor nerves, and various endocrine factors.

Compliance and Arterial Resistance: Resistance and compliance are the two primary physical principles controlled by the mammalian cardiovascular system. Compliance can be understood as distensibility. This is discussed in Levick, Rodney, *An Introduction to Cardiovascular Physiology*. 4th. New York: Oxford University Press, 2003. It is a property of the arterial wall to be distended and then to return to its original shape. During systole, a given volume of blood (stroke volume), moves from the ventricle into the aorta. For all practical purposes, blood is incompressible and this stroke volume must "make room for itself." It does this by distending the arterial wall and pushing the entire volume of blood further down the peripheral vasculature:

$$\text{Arterial Compliance } (C) = \frac{\text{Increase in Blood Volume}}{\text{Increase in Arterial Pressure}} = \frac{\Delta V}{\Delta P} \quad \text{(Eq. 5)}$$

Arterial compliance C is a value for the increase in arterial pressure (ΔP) per increase in blood volume in the arterial system (ΔV). This relationship is relatively linear only up to 80 mm Hg, at which point the relationship becomes curvilinear. Arterial compliance is contingent upon a number of factors and is not a constant value. For example, compliance decreases with arteriosclerosis, the stiffening of the arterial vessels. During the cardiac cycle, arterial compliance decreases as the blood pressure rises. This is because of the tensile strength of collagen in the wall. Therefore, an increase in pulse pressure will be the result of an increase in mean arterial pressure. Pulse pressure is defined as the increase in pressure from diastole to systole.

Venous compliance is approximately fifty times greater than arterial compliance. The venous system has a much greater blood capacity and thereby, in humans, a 100 mL blood input will not make much of a difference in the venous pressure. Unlike the arterial system, venous compliance is evident not in the stretching of the vessel walls but rather a change in vessel shape. At low venous pressures, large veins have an ellipsoidal shape and at high venous pressures they have a circular shape. Increased venous blood pressure exerts a stress on the venous walls, causing the vessel to distend and assume a circular form.

Frank Starling Mechanism: The Starling "Law of the Heart" is perhaps the quintessential maxim of cardiac physiology. It states: The greater the stretch of the ventricle in diastole, the greater stroke work achieved in systole. Levick, Rodney, *An Introduction to Cardiovascular Physiology.* 4th. New York: Oxford University Press, 2003. Stroke work is the stroke volume ejected for given ventricular filling volume. The physiology underlying this law can be divided into two separate aspects, a length-tension relationship and increased contractility. With the length-tension relationship, as the heart muscle is stretched to a greater extent—greater pre-load—there is more optimal overlap between the contractile elements actin and myosin, enabling a greater active contraction force. There also is a degree of passive force from the elastic and tensile elements of ventricular tissue that affect the pressure-volume relationship during ventricular filling. This is provided by the collagen and elastin present in the cardiac tissue. However, the other key component is increased contractility, a muscle length-independent measure of contractile strength. Current literature suggests contractility to be caused by extrinsic control of cardiac activity by systems such as sympathetic nervous activity, as well as increased calcium sensitivity in the cardiac muscle cell. Increased ventricular filling causes an increase in muscle cell stretch. Levick. Enhanced ventricular filling is caused by increased venous pressure. The mechanical model exhibits the change in stroke volume due to increased filling.

Cardiovascular Model Engineering/Modeling the Ventricle: Many mechanical models of the mammalian cardiovascular system have been constructed for the purpose of education and to simulate system behavior. A great challenge to these mechanical systems is the illustration of the "Law of the Heart." Bag-like ventricles have been utilized for modeling the passively-filling nature of the mammalian ventricle. In this manner, venous pressure can fill the heart and control diastolic volume. The problem that many of these model hearts encounter is that they do not demonstrate appropriate diastolic volumes in relation to arterial pressure. Bayliss (1955) was able to overcome this problem by employing a spring with a cam to assure that contraction occurs quickly and powerfully. Isovolumetric contraction only ends after ventricular pressure is greater than arterial pressure. Bayliss, L. E. "A Mechanical Model of the Heart." *Journal of Physiology* 127 (1955): 358-379.

Cardiovascular Model Engineering/Arterial Compliance: The Reverend Stephen Hales (1677-1761) was the first scientist to discover the effects of blood loss on arterial pressure. He also was the first to show that the majority of vascular resistance lies in tiny vessels. Hales describe the arterial system to be similar in function to an "inverted, air-filled dome," acting to smooth the "pulsatile" nature of blood pressure so that flow would be smooth and constant. It was Hales who described the compression chamber as a windkessel in his book Haemastaticks. Nichols, W. W. and O'Rourke, M. F. *McDonald's Blood Flow in Arteries*, London: Arnold, 1998

Bayliss' (1955) model featured a capacitance component similar in functioning to that of Westerhof. Bayliss (1955) described this as an "inverted bottle mounted on a side tube just beyond the output valve." (p. 362) This component is known as a windkessel and it is used in the system to simulate the arterial compliance and venous compliance. Vogel, Steven. *Vital Circuits*. New York: Oxford University Press, 1992.

The windkessel is a crucial component of the model and some of its previous usages will be discussed. A windkessel is a sealed off container, often a cylinder with a liquid volume beneath an air volume in which liquid moves through the bottom of the windkessel and pressurizes the air above it. An increase in liquid volume decreases air volume and pressurizes the air in the windkessel.

N. Westerhof and R. M. Huisman (1987) constructed a basic, three-component model of the arterial system. Westerhof, Nicolaas. And R. M. Huisman "Arterial haemodynamics of hypertension." *Clinical Science* 72 (1987): 391-398. This system consisted of two resistors and a compliance component—a three element windkessel. This model was employed as a load for an isolated cat heart. This system controls the two essential variables of the arterial system: peripheral resistance and arterial compliance. By controlling these two features, pressure and flow behavior could be observed. By using a cat heart, cardiac features such as heart rate, contractility, and filling pressure were controlled and only the two arterial characteristics—compliance and resistance—were changed.

Westerhof et al. (1971) found great success utilizing this three-element model with a windkessel approximation of arterial compliance. Westerhof, Nicolaas, Gijs Elzing a, and Pieter Sipkema. "An artificial system for pumping hearts." *Journal of Applied Physiology* 31 (1971): 776-781. They utilized the ideal gas law and the equation for capacitance. Capacitance is a term from electrical engineering for the storage of charge. It is often used in cardiovascular physiology to describe the ability of the veins to store blood volume. In essence, all vessels have a capacitance—an energy storage ability—as they stretch to accommodate a given volume. Pressure energy generated by the heart is stored as potential energy in the tensing of collagen fibers of the vessels. This energy is then released as kinetic energy as the vessels walls recoil, pushing blood down stream. Capacitance can be understood as the physical entity which facilitates the property of compliance. Compliance is the property describing the yielding of a material to a physical force. Westerhof et al. (1971) uses the term capacitance rather than compliance in their description of their mechanical model. They constructed a windkessel to provide a capacitance for the purpose of imitating arterial compliance. In this paper, the term compliance will be used rather than capacitance.

$$PV=RT, \tag{Eq. 6}$$

$$C=dV/dP, \tag{Eq. 7}$$

Where C=capacitance (compliance); P=pressure, V=volume; T=(absolute) temperature, and R=gas constant. Westerhof et al (1971) thereby utilized the relationship C=V/P in compliance calculations. In situations with constant pressure, a decrease in the volume available for air above the blood volume causes a decrease in compliance. This pivotal relationship served as the foundation for the construction of arterial and venous windkessels in my model.

The model constructed by Westerhof et al. (1971) was superior in capacitance to those employing elastic tubes to simulate compliance because the air reservoir had the ability to be changed and controlled. By utilizing a simple air reservoir above a water volume as in the windkessel, a given capacitance value can be easily reproduced. The arterial model constructed by Westerhof et al. (1971) effectively simulates cardiac load. Westerhof et al. (1971) featured a windkessel design in which air volumes are calibrated and were used as a measure of arterial capacitance. They found that the flow and pressure of their arterial model related well with measurements from in vivo studies. In the study, the non-Newtonian aspects of fluid flow are disregarded.

Cardiovascular Model Engineering/Arterial Resistance: In Bayliss' (1955) classic model, the primary source of resistance in the arterial system is simulated by a screw clamp resistor located prior to the capillary component. In Bayliss' model, changing peripheral resistance did not change venous pressure. When peripheral resistance increased, the hydraulic power of the pump remained the same. Therefore the arterial system increased in fluid capacity, which is stored in the windkessel due to simulated compliance. Nichols noted that this event caused a slight decrease in venous volume in Bayliss' system. For the resistance component, Westerhof et al. (1971) constructed an arterial system that included a block with thousands of narrow flow channels. The side of the block was fixed with an apparatus so that a slide could move down and up to control resistance by closing or opening flow channels.

Modeling Pathology of the Cardiovascular System:

The focus of more recent modeling of the arterial systems is to demonstrate hypertension. Hypertension, chronically high blood pressure, causes a series of pathologic long-term effects. This pathology is also one focus of the invention. The two primary problems of hypertension are the increase in peripheral resistance and the decrease in arterial distensibility. Nichols identified that in hypertension, cardiac output (CO) remains high; therefore, there is an increase in mean arterial pressure. The two primary variables an arterial system can control are arterial compliance and peripheral resistance.

SUMMARY OF INVENTION

The invention includes a hydraulic model of the cardiovascular system for illustrating a plurality of physiological concepts and relationships including arterial compliance, venous compliance, and peripheral resistance, said model comprising: a.) a cardiac subsystem for moving a fluid in a singular direction in a closed hydraulic system; b.) an arterial subsystem for modeling arterial compliance, the arterial subsystem fluidically coupled with the cardiac subsystem to receive the fluid discharged from the cardiac subsystem; c.) a peripheral resistance subsystem for modeling peripheral resistance, the peripheral resistance subsystem fluidically coupled with the arterial subsystem to receive the fluid discharged from arterial subsystem; d.) a peripheral venous (PV) subsystem for modeling peripheral venous compliance and for modeling a peripheral venous pump (PVP), the peripheral venous subsystem fluidically coupled with the peripheral resistance subsystem; and e.) a central venous (CV) subsystem for modeling central venous compliance and for modeling a thoracic pump (TP), the CV subsystem fluidically coupled with the PV subsystem to receive the fluid discharged from the PV subsystem and to pass the fluid to the cardiac subsystem to complete the cardiovascular cycle.

In a preferred embodiment, the cardiac subsystem for moving a fluid in a singular direction in a closed hydraulic system comprises:

at least one cardiac chamber wall forming a voidspace within said at least one chamber wall,
a balloon like tubular member contained within the voidspace, said tubular member having an upstream opening, and a downstream opening connected by a deformable wall for carrying a fluid,
fluid conduit connected to the upstream opening and passing through the chamber wall,
fluid conduit connected to the downstream opening and passing through the chamber wall,
a transducer port extending into the fluid conduit at a point downstream of the downstream opening for reading a ventricular pressure,
a pressure control port extending through the chamber wall for controlling a pressure in the voidspace with a pressure regulator,
an upstream check valve in communication with the upstream opening (or the fluid conduit connected to the upstream opening for preventing the fluid from flowing out of the upstream opening, and
a downstream check valve in communication with the downstream opening (or the fluid conduit connected to the downstream opening) for preventing the fluid from flowing into the balloon like tubular member via the downstream opening,
wherein, at diastole, the pressure in the voidspace is reduced via the pressure regulator, causing the fluid to flow through the upstream check valve into the upstream opening expanding the deformable wall of the balloon like tubular member, and wherein at systole the pressure in the voidspace is increased via the pressure regulator causing the fluid to flow out of the downstream opening through the downstream check valve.

In a preferred embodiment, the arterial subsystem for modeling arterial compliance is fluidically coupled with the cardiac subsystem to receive the fluid discharged from the cardiac subsystem and comprises:

i.) an arterial windkessel (AW) for modeling arterial compliance, said AW including:
a reservoir defined by an inlet, and an outlet connected by at least one reservoir wall,
the at least one reservoir wall extending upwardly to an elevation sufficient to contain the fluid and an arterial windkessel air volume (AWAV) located above the fluid,
the at least one reservoir wall forming a rim for receiving a sealing lid for sealably fitting within the at least one reservoir wall and for preventing the AWAV from venting to atmospheric pressure, and
the sealing lid slidably engages the at least one reservoir wall to cause the AWAV to vary according to a selectable vertical location of the sealing lid,
wherein the AWAV compresses and expands in response to a pressure wave of the fluid discharging from the cardiac subsystem, thereby buffering the pressure wave to a degree that correlates with the AWAV;

ii.) an arterial pressure transducer port located at a point downstream from the arterial windkessel for connecting with a pressure transducer for monitoring an arterial pressure of the fluid flowing downstream from the arterial windkessel; and iii.) a flow transducer for measuring the flow rate of the fluid flowing downstream of the arterial windkessel.

In a preferred embodiment, the peripheral resistance subsystem for modeling peripheral resistance is fluidically coupled with the arterial subsystem to receive the fluid discharged from arterial subsystem and includes:

i.) a flowpath network including:
one or more distribution manifolds for receiving the fluid flowing downstream of the arterial subsystem and distributing said fluid among a plurality of collapsible conduits,
wherein the fluid flowing downstream of the flow transducer is distributed among a plurality of collapsible conduits, thereby allowing a user to model a range of peripheral resistances to flow by collapsing one or more of the collapsible conduits; and ii.) one or more collection manifolds for merging the fluid distributed among the plurality of collapsible conduits and passing the fluid to at least one downstream conduit.

In a preferred embodiment, the peripheral venous (PV) subsystem for modeling peripheral venous compliance and for modeling a peripheral venous pump (PVP) is fluidically coupled with the arterial subsystem to receive the fluid discharged from the at least one downstream conduit and comprises:

i.) a peripheral venous windkessel (PVW) for modeling peripheral venous compliance, said PVW including:
a reservoir defined by an inlet, and an outlet connected by at least one reservoir wall,
the at least one reservoir wall extending upwardly to an elevation sufficient to contain the fluid and a peripheral venous windkessel air volume (PVWAV) located above the fluid,
the at least one reservoir wall forming a rim for receiving a sealing lid for sealably fitting within the at least one reservoir wall and for preventing the PVWAV from venting to atmospheric pressure, and
the sealing lid slidably engages the at least one reservoir wall to cause the PVWAV to vary according to a selectable vertical location of the sealing lid,
wherein the PVWAV compresses and expands in response to a pressure wave of the fluid discharging from the at least one downstream conduit of the arterial subsystem, thereby buffering the pressure wave to a degree that correlates with the PVWAV;

ii.) a peripheral venous check valve located upstream of the PVW for preventing the fluid from flowing out of the inlet of the PWAV;

iii.) a PVP control port extending through the at least one reservoir wall of the PVW for modulating a pressure in the PVW with a PVP pressure regulator, wherein the PVP pressure regulator exerts a modulating pressure to the PVWAV, thereby creating a modulated PVP pressure for modeling the PVP; and iv.) a PV transducer port for reading a PV pressure at or near the PVW with a pressure transducer.

In a preferred embodiment, the central venous (CV) subsystem is fluidically coupled with the PV subsystem to receive the fluid discharged from the outlet of the PVW and to pass the fluid to the cardiac subsystem and comprises:

i.) a central venous windkessel (CVW) for modeling central venous compliance, said CVW including:
a reservoir defined by an inlet, and an outlet connected by at least one reservoir wall,
the at least one reservoir wall extending upwardly to an elevation sufficient to contain the fluid and a central venous windkessel air volume (CVWAV) located above the fluid,
the at least one reservoir wall forming a rim for receiving a sealing lid for sealably fitting within the at least one reservoir wall and for preventing the CVWAV from venting to atmospheric pressure, and
the sealing lid slidably engages the at least one reservoir wall to cause the CVWAV to vary according to a selectable vertical location of the sealing lid,
wherein the CVWAV compresses and expands in response to a pressure wave of the fluid discharging from the at least one downstream conduit of the PV subsystem, thereby buffering the pressure wave to a degree that correlates with the CVWAV;

ii.) a central venous check valve located upstream of the CVW for preventing the fluid from flowing out of the inlet of the CWAV;

iii.) a TP control port extending through the at least one reservoir wall of the CVW for modulating a pressure in the CVW with a TP pressure regulator, wherein the TP pressure regulator exerts a TP modulating pressure to the CVWAV, thereby creating a modulated CVP for modeling a TP; and iv.) a CV transducer port for reading a CV pressure at or near the CVW with a pressure transducer.

In a preferred embodiment, operation of the cardiac subsystem is actuated by computer control of the pressure regulator connected to a pressure source and in communication with the voidspace via the pressure control port.

In a preferred embodiment, operation of the PVP is actuated by computer control of the PVP pressure regulator connected to a pressure source and in communication with the PVWAV via the PVP control port.

In a preferred embodiment, operation of the TP is actuated by computer control of the TP pressure regulator connected to a pressure source and in communication with the CVWAV via the TP control port.

In a preferred embodiment, various output parameters are read, translated, and displayed with a computer, said parameters include, but are not limited to cardiac chamber pressure measured with the transducer port, ventricular pressure measured at a point downstream of the cardiac chamber, arterial pressure measured with the arterial pressure transducer port, flow rate measured with the flow transducer, capillary pressure measured with the capillary pressure transducer port, peripheral venous pressure measured with the PVP transducer port, and central venous pressure measured with the CV transducer port.

The invention embodies a method of illustrating a plurality of physiological concepts and relationships concerning the cardiovascular system including arterial compliance, venous compliance, and peripheral resistance. Said method of illustration includes manipulation of one or more of the various parameters of the subsystems of the model and observing one or more of the various output parameters according to a set predetermined procedural steps.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE EMBODIMENTS

The invention relates generally to a hydraulic model of the cardiovascular system used to illustrate a plurality of physiological concepts and relationships including arterial compliance, venous compliance, arterial resistance, the various effects of ventricular filling pressure and filling time on cardiac stroke volume, hypertension and exercise.

The cardiovascular model is a plurality of subsystems that operate together with the assistance of a computer, electro-mechanical controls, and manually operated parameters. The subsystems include a.) a cardiac subsystem for moving a fluid in a singular direction in a closed hydraulic system; b.) an arterial subsystem for modeling arterial compliance, the arterial subsystem fluidically coupled with the cardiac subsystem to receive the fluid discharged from the cardiac subsystem; c.) a peripheral resistance subsystem for modeling peripheral resistance, the peripheral resistance subsystem fluidically coupled with the arterial subsystem to receive the fluid discharged from arterial subsystem; d.) a peripheral venous (PV) subsystem for modeling peripheral venous compliance and for modeling a peripheral venous pump (PVP), the peripheral venous subsystem fluidically coupled with the peripheral resistance subsystem to receive the fluid discharged from the peripheral resistance; and e.) a central venous (CV) subsystem for modeling central venous compliance and for modeling a thoracic pump (TP), the CV subsystem fluidically coupled with the PV subsystem to receive the fluid discharged from the outlet of the PVW and to pass the fluid to the cardiac subsystem.

A personal computer is used to operate controllers, which in turn operate various parameters of the subsystem using pressure regulators and compressed air from a compressed air source. The personal computer is also used in conjunction with pressure transducers and flow transducers to acquire information about the operation of the model. The computer can be substituted, in an alternate embodiment, with other electronic control and data acquisition equipment to achieve the same results.

In some instances, at least one user manually modifies certain parameters of the model. One example includes modifying compliance by changing the location of the sealing lids of the windkessels. Another example includes modifying peripheral resistance by pinching one or more of the collapsible conduits of the flowpath network.

Figure 1:
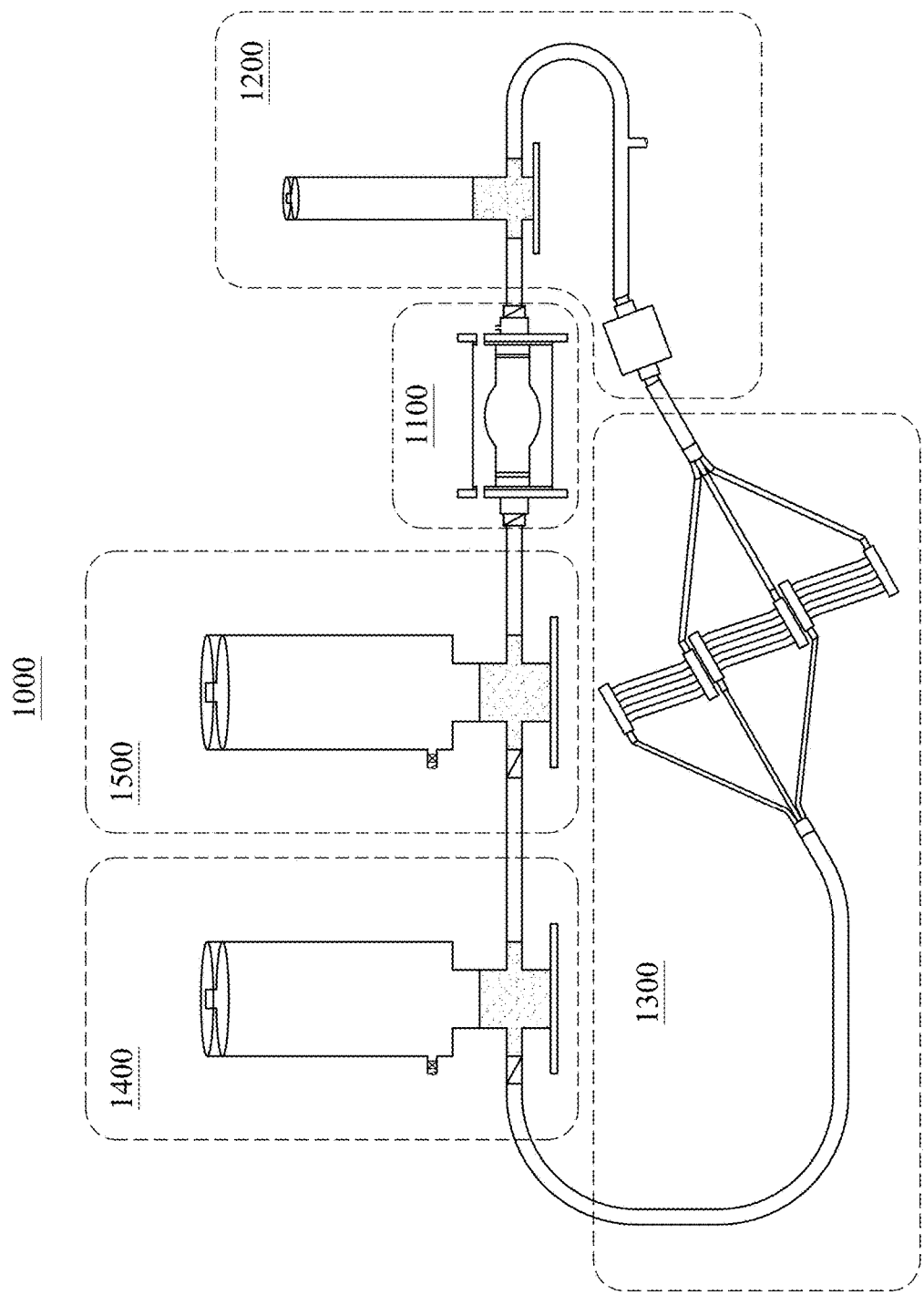
FIG. 1 is a schematic representation of the cardiovascular system model according to an embodiment.

Referring now in detail to the drawings wherein like reference numerals designate corresponding parts throughout the several views, various embodiments of the present invention are shown. FIG. 1 is a schematic representation of the cardiovascular system model 1000 identifying the cardiac subsystem 1100, the arterial subsystem 1200, the peripheral resistance subsystem 1300, the peripheral venous subsystem 1400, and the central venous subsystem 1500.

Figure 2:
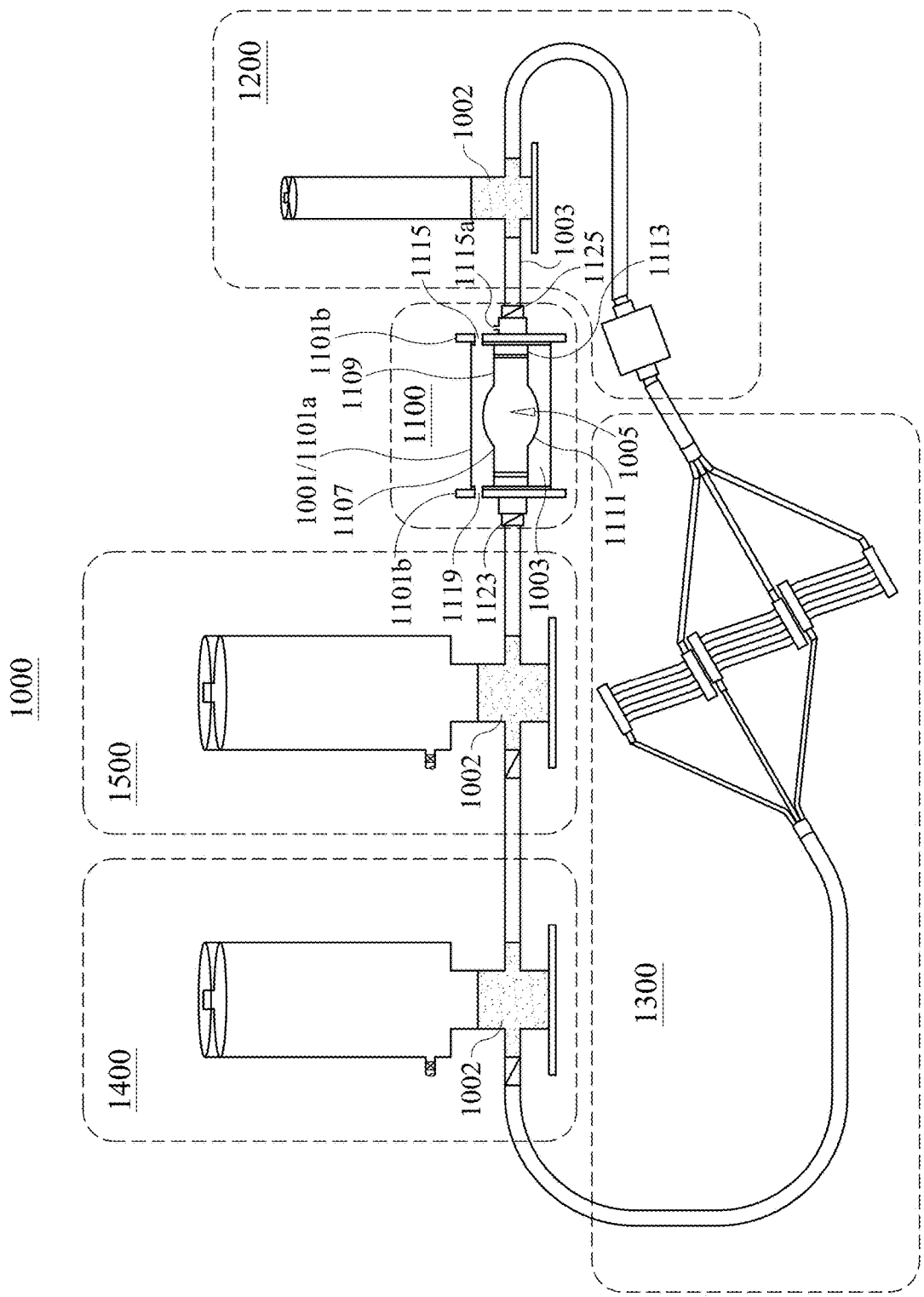
FIG. 2 is a schematic representation of the cardiovascular system model with particular reference to the cardiac subsystem.

Referring now to FIG. 2, the cardiac subsystem 1100 is the prime fluid mover of the cardiovascular system. It is designed for moving a fluid 1002 in a singular direction in a closed hydraulic system. The cardiac subsystem 1100 models a single ventricle. A cardiac chamber 1101 is defined by at least one cardiac chamber wall 1101, 1101a, 1101b, which forms a voidspace 1103 within the at least one chamber wall 1101, 1101a, 1101b. In a preferred embodiment, the cardiac chamber 1101 includes a 6" (15.3 cm) transparent Plexiglas tube 1101 with an inner diameter of 8.2 cm. Two large rubber stoppers 1101b seal each end of the tube 1101, effectively sealing the chamber when clamped by dual "Quick-Grip®" clamps. Both stoppers 1101b are drilled through at the center to enable a PVC pipe connector (fluid conduit 1113) to fit snugly in the stoppers 1101b.

A balloon like tubular member 1105 (the model ventricle) is contained within the voidspace 1103. The tubular member 1105 has an upstream opening 1107 and a downstream opening 1109 connected by a deformable wall 1111 for carrying the fluid 1002. The ventricle was created out of two latex balloons. One is cut at its apex and the neck of another balloon is attached. The sealing involved fixing a short piece of 1 cm ID plastic tubing beneath the sealing site, covering its exterior surface with latex, pulling both balloon pieces over the piece, and then sealing with a cable tie. Pieces of fluid conduit 1113 are connected to the upstream opening 1107 and the downstream opening 1109 of the tubular member 1105 for passing the fluid 1002 through the stoppers 1101b. Inside the chamber 1101, the constructed ventricle fit between the two ends of PVC pipe (fluid conduit 1113).

An upstream check valve 1123 is in communication with the upstream opening 1107 by being connected to the fluid conduit 1113 that is attached to the upstream opening 1107. The upstream check valve is oriented to prevent the fluid 1002 from flowing out of the upstream opening 1107, thereby permitting singular direction of flow into the tubular member 1105. Similarly, a downstream check valve 1125 is in communication with the downstream opening 1109 to prevent the fluid 1002 from flowing into the tubular member 1005 via the downstream opening 1009. Respiratory check valves (2.4 cm ID) are preferred because of their ability to operate at very low breaking pressures.

In one embodiment, a transducer port 1115 extends through the chamber wall 1101, 1101a, 1101b for reading a pressure inside the voidspace 1103 with a pressure transducer 1117. In a preferred embodiment, a small (0.5 cm) hole was located on the outflow sidewall of the chamber 1001b. A transducer port 1115a extends into the fluid conduit 1003 at a point downstream of the downstream opening for reading a ventricular pressure. Similarly, a pressure control port 1119 extends through the chamber wall 1101, 1101a, 1101b for controlling the pressure in the voidspace 1103 with a pressure regulator 1121. In one embodiment, a 1 cm hole is drilled into the chamber wall 1101b to enable inflow from the high pressure source—a Fairchild® air flow regulator. The Fairchild® is connected to a high pressure air tank, which enabled the voidspace 1103 to be filled rapidly and to be decompressed quickly using the computer and/or the controller.

In operation, at diastole, the pressure in the voidspace 1103 is reduced via the pressure regulator 1121, causing the fluid to flow through the upstream check valve 1123 into the upstream opening 1107, expanding the deformable wall 1111 of the balloon like tubular member 1105. At systole, the pressure in the voidspace 1103 is increased via the pressure regulator 1121, causing the fluid 1002 to flow out of the downstream opening 1109 through the downstream check valve 1125. Regulating the pressure for systole through the Fairchild involved small changes in output voltage and pulse duration. Using the computer and the controller, a frequency of 1 Hz, 2.76V and 200 ms duration was used to obtain the approximate 120 mmHg systolic pressure. This effectively provided a systole-diastole duration ratio similar to humans.

Figure 3:
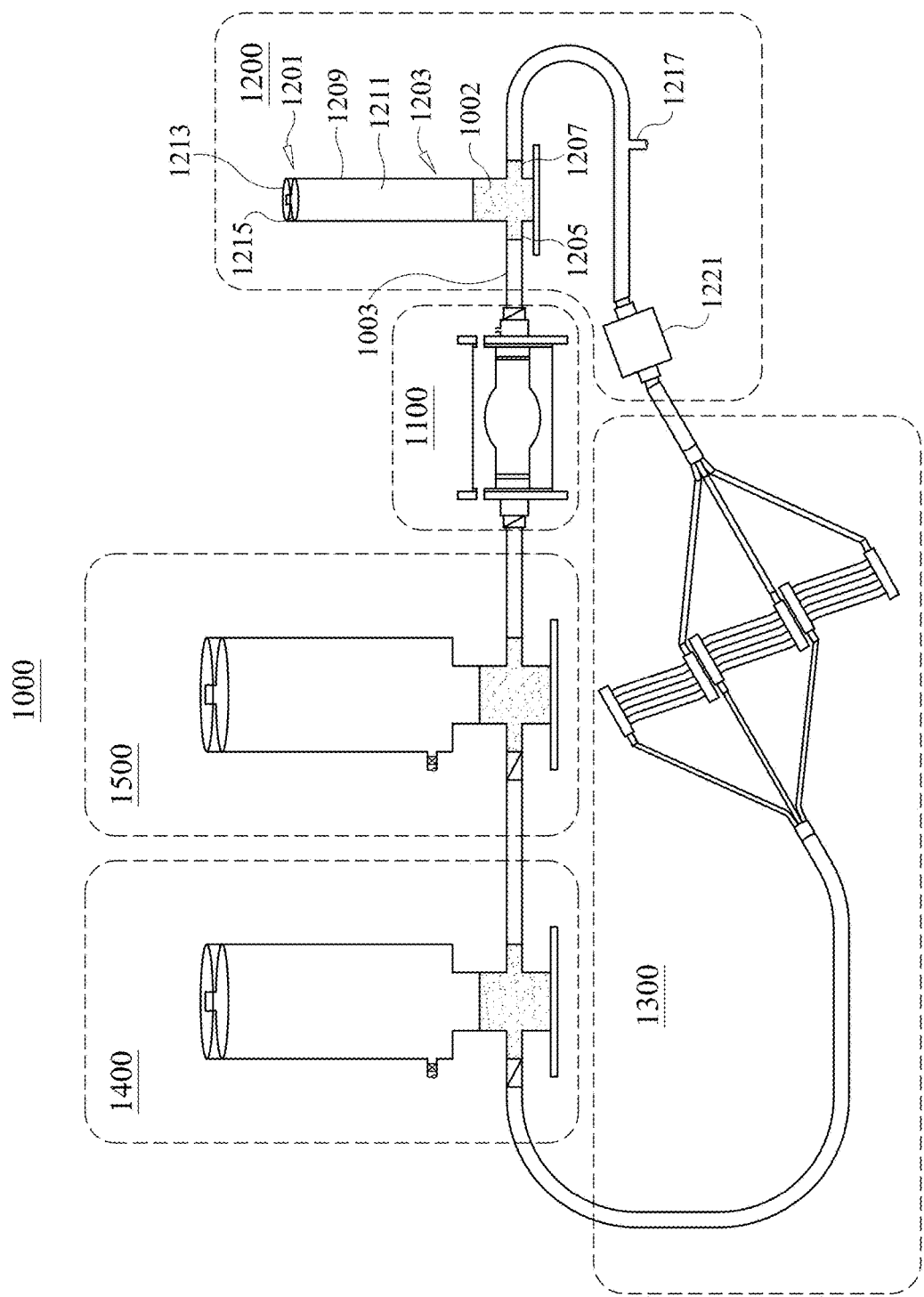
FIG. 3 is a schematic representation of the cardiovascular system model with particular reference to the arterial subsystem.

Referring to FIG. 3, the arterial subsystem 1200 models arterial compliance. The arterial subsystem is fluidically coupled with the cardiac subsystem 1100 to receive the fluid 1002 discharged from the cardiac subsystem 1100. In a preferred embodiment, fluid conduit 1003 (PVC conduit and Silastic® tubing (1.2 cm ID)) connects with the arterial windkessel (AW) 1201. The AW includes a reservoir 1203 defined by an inlet 1205 and an outlet 1207 connected by at least one reservoir wall 1209. The at least one reservoir wall 1209 extends upwardly to an elevation sufficient to contain the fluid 1002 and an arterial windkessel air volume (AWAV) 1211 located above the fluid 1002. The at least one reservoir wall 1209 forms a rim 1213 for receiving a sealing lid 1215 for sealably fitting within the at least one reservoir wall 1209 and for preventing the AWAV 1211 from venting to atmospheric pressure at normal operating conditions. The sealing lid 1215 slidably engages the at least one reservoir wall 1209 to cause the AWAV 1211 to vary according to a selectable vertical location of the sealing lid 1215. A valve may be incorporated into the reservoir wall 1209 to selectively allow the AWAV to vent to atmosphere when changing the elevational location of the sealing lid 1215.

In operation, the AWAV 1211 compresses and expands in response to a pressure wave of the fluid 1002 discharging from the cardiac subsystem 1100, thereby buffering the pressure wave to a degree that correlates with the AWAV 1211. In the instance a user modifies the vertical location of the sealing lid 1215 to decrease the AWAV, the arterial subsystem 1200 will have less capacity to absorb the pressure wave of the fluid 1002, thereby modeling reduced compliance of the arteries. Inversely, if a user increases the AWAV 1211, the arterial subsystem 1200 will have a greater capacity to absorb the pressure wave of the fluid 1002, thereby modeling increased compliance of the arteries.

An arterial pressure transducer port 1217 is located at a point downstream from the arterial windkessel 1201 for connecting with a pressure transducer (not shown) for monitoring an arterial pressure of the fluid 1002 flowing downstream from the arterial windkessel 1201. In one embodiment, Silastic tubing connected to the output of the windkessel (0.9 cm ID) and fitted with a T-connector that provided a port for the arterial pressure transducer. After this junction, tubing continues to a flow transducer 1221 (Cole Palmer® model number 32703-54) and measures the flow rate of the fluid 1002 flowing downstream of the arterial windkessel. The flow transducer 1221 can be located at various locations, and the location of the flow transducer 1221 of the particular embodiment is not intended to be limiting.

Figure 4:
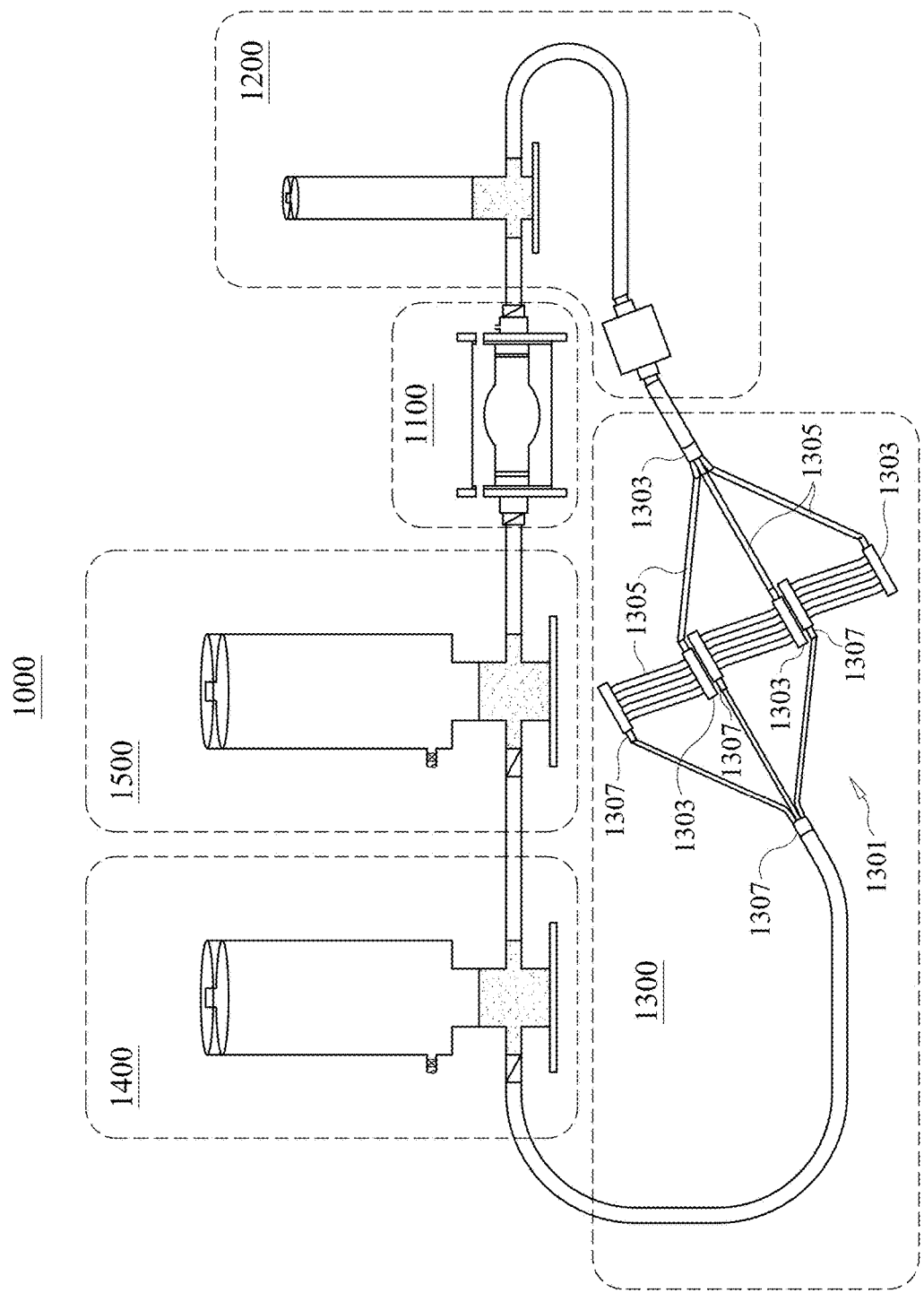
FIG. 4 is a schematic representation of the cardiovascular system model with particular reference to the peripheral resistance subsystem.

Referring to FIG. 4, the peripheral resistance subsystem 1300 models peripheral resistance and is fluidically coupled with the arterial subsystem 1200 to receive the fluid 1002 discharged from arterial subsystem 1200. The peripheral resistance subsystem includes a flowpath network 1301, which includes one or more distribution manifolds 1303 for receiving the fluid 1002 flowing downstream of the flow transducer 1221 and distributing said fluid 1002 among a plurality of collapsible conduits 1305. The peripheral resistance subsystem further includes one or more collection manifolds 1307 for merging the fluid distributed among the plurality of collapsible conduits 1305 and passing the fluid to at least one downstream conduit 1309. In a preferred embodiment, the outflow end of the flow meter/flow transducer 1221 is connected via Silastic tubing to the manifold resistance apparatus or the flowpath network 1301. The Silastic tubing connects to the end of the upstream manifold 1303a, which splits the flow into six smaller tubes 1305 a, each of length 9.1 cm and ID of 1.665 mm. The small tubes attach to the down stream manifold 1303b and then Silastic tubing. In operation, the fluid 1002 flowing downstream of the flow transducer 1221 is distributed among a plurality of collapsible conduits 1305, thereby allowing a user to model a range of peripheral resistances to flow by collapsing one or more of the collapsible conduits 1305. Alternate embodiments of the peripheral resistance subsystem may include any similar mechanism or mechanisms that are capable of varying resistance to fluid flow, such as clamps, ball valves, butterfly valves, or any combination thereof.

Figure 5:
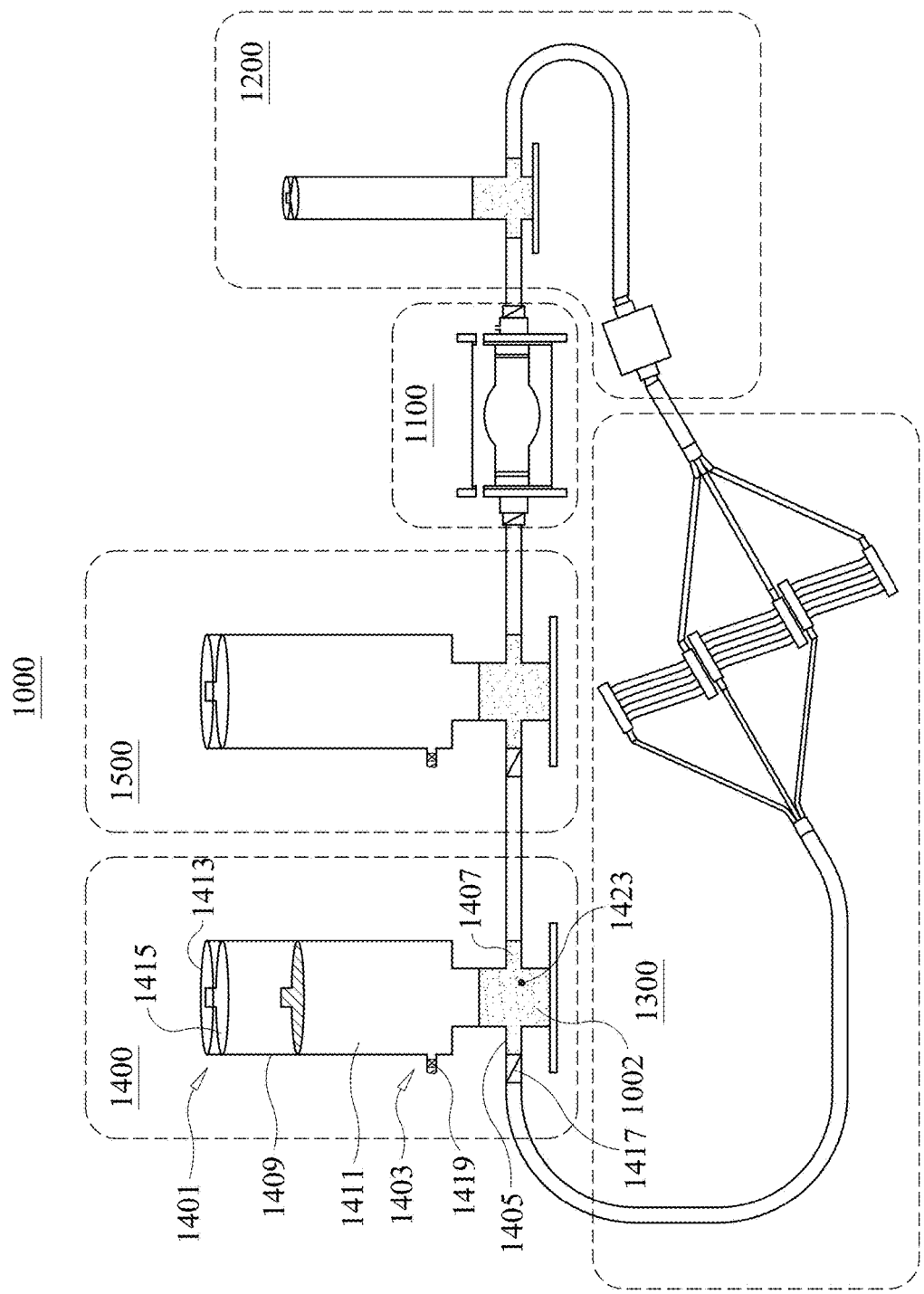
FIG. 5 is a schematic representation of the cardiovascular system model with particular reference to the peripheral venous subsystem.

Referring now to FIG. 5, the peripheral venous (PV) subsystem 1400 models peripheral venous compliance and a peripheral venous/skeletal muscle pump, the peripheral venous subsystem 1400 is fluidically coupled with the peripheral resistance subsystem 1300 to receive the fluid discharged from the peripheral resistance subsystem 1300.

The peripheral venous windkessel (PVW) 1401 includes a reservoir 1403 defined by an inlet 1405 and an outlet 1407 connected by at least one reservoir wall 1409. The at least one reservoir wall 1409 extends upwardly to an elevation sufficient to contain the fluid 1002 and a peripheral venous windkessel air volume (PVWAV) 1411 located above the fluid 1002. The at least one reservoir wall 1409 forms a rim 1413 for receiving a sealing lid 1415 for sealably fitting within the at least one reservoir wall 1409 and for preventing the PVWAV 1411 from venting to atmospheric pressure. The sealing lid 1415 slidably engages the at least one reservoir wall 1409 to cause the PVWAV 1411 to vary according to a selectable vertical location of the sealing lid 1415. A valve may be incorporated into the reservoir wall 1409 to selectively allow the PVWAV to vent to atmosphere when changing the elevation of the sealing lid 1415.

In operation, the PVWAV 1411 compresses and expands in response to a pressure wave of the fluid 1002 discharging from the peripheral resistance subsystem, thereby buffering the pressure wave to a degree that correlates with the PVWAV 1411. Similar user manipulation of the sealing lid 1415 is used to manipulate compliance (venous tone) as discussed herein.

A peripheral venous check valve 1417 is located upstream of the PVW 1401 for preventing the fluid 1002 from flowing out of the inlet 1405 of the PVW 1401. A PVP control port 1419 extends through the at least one reservoir wall 1409 of the PVW 1401 for modulating a pressure in the PVW 1401 with a PVP pressure regulator (not shown). In operation, PVP pressure regulator (not shown) exerts a modulating pressure to the PVWAV 1411 via the PVP control port 1419, thereby creating a modulated PVP pressure for modeling the skeletal muscle/peripheral venous pump. Pressure modulation, preferably is controlled by having the computer send signals to the controller, which controls operation of the pressure regulator, allowing the flow of compressed air in and out of the PVW 1401 via the PVP control port 1419. A peripheral venous transducer port 1423 is located at or near the PVW 1401 to read a peripheral venous pressure of the fluid 1002.

Figure 6:
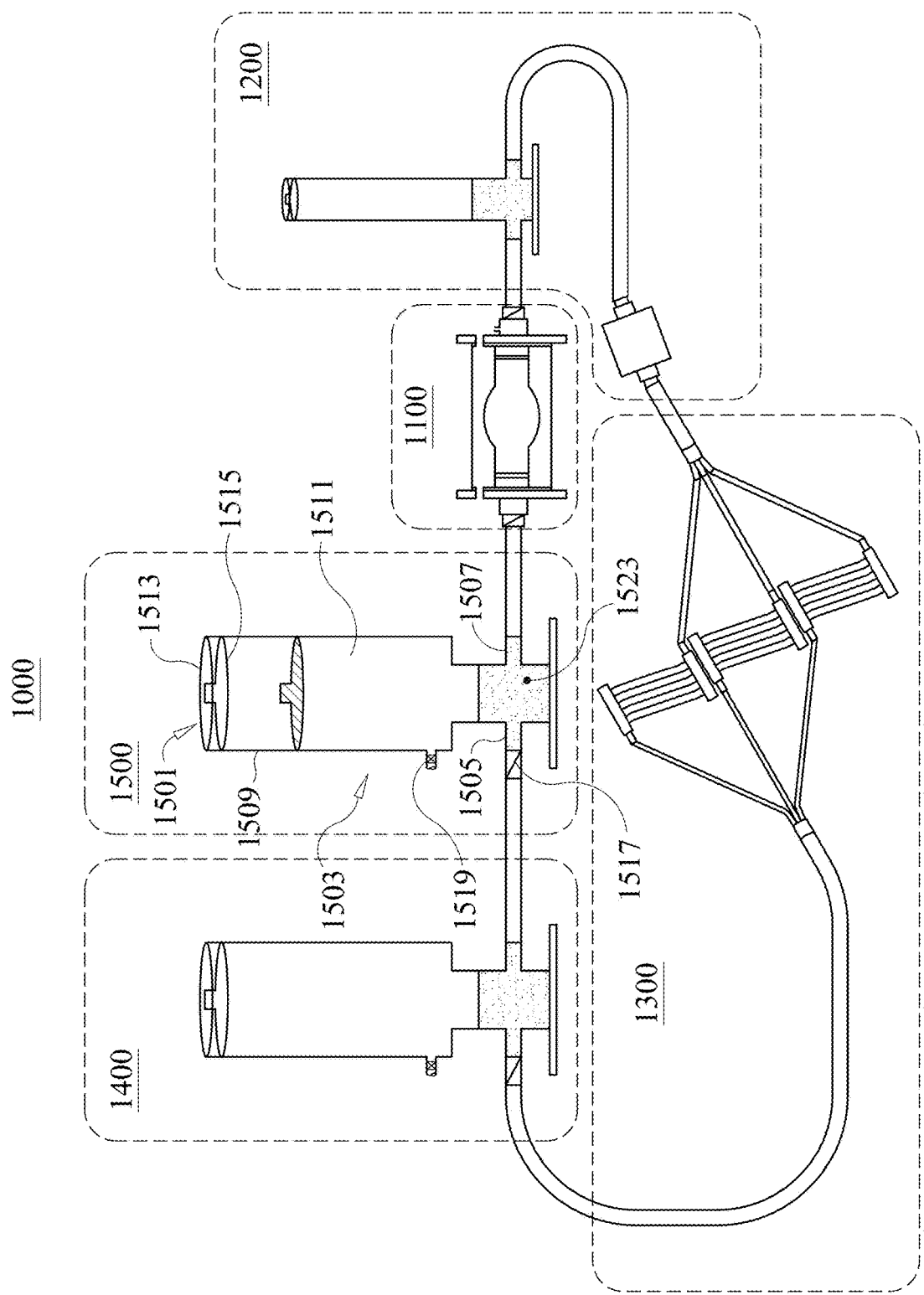
FIG. 6 is a schematic representation of the cardiovascular system model with particular reference to the central venous subsystem.

Referring to FIG. 6, the central venous (CV) subsystem 1500 models central venous compliance and models a thoracic pump (TP). The CV subsystem 1500 is fluidically coupled with the PV subsystem 1400 to receive the fluid 1002 discharged from the outlet 1407 of the PVW 1401 and to pass the fluid 1002 to the cardiac subsystem 1100.

The central venous windkessel (CVW) 1501 models central venous compliance and includes a reservoir 1503 defined by an inlet 1505, and an outlet 1507 connected by at least one reservoir wall 1509. The at least one reservoir wall 1509 extends upwardly to an elevation sufficient to contain the fluid 1002 and a central venous windkessel air volume (CVWAV) 1511 located above the fluid 1002. The at least one reservoir wall 1509 forms a rim 1513 for receiving a sealing lid 1515 for sealably fitting within the at least one reservoir wall 1509 and for preventing the CVWAV 1511 from venting to atmospheric pressure. The sealing lid 1515 slidably engages the at least one reservoir wall 1509 to cause the CVWAV 1511 to vary according to a selectable vertical location of the sealing lid 1515.

In operation, the CVWAV 1511 compresses and expands in response to a pressure wave of the fluid 1002 discharging from the PV subsystem 1400, thereby buffering the pressure wave to a degree that correlates with the CVWAV 1511. Similar user manipulation of the sealing lid 1515 is used to manipulate compliance (venous tone) as discussed herein.

A central venous check valve 1517 is located upstream of the CVW 1501 for preventing the fluid 1002 from flowing out of the inlet of the CWAV 1511. A TP control port 1519 extends through the at least one reservoir wall 1509 of the CVW 1501 for modulating a pressure in the CVW 1501 with a TP pressure regulator (not shown). In operation, the TP pressure regulator 1521 exerts a TP modulating pressure to the CVWAV 1511, thereby creating a modulated central venous pressure for modeling the thoracic pump. Pressure modulation as discussed herein, preferably is controlled by having the computer send signals to the controller, which controls operation of the pressure regulator, allowing the flow of compressed air in and out of the CVW 1501 via the TP control port 1519. A central venous transducer port 1523 is located at or near the CVW 1501 for reading a CV pressure with a pressure transducer.

Figure 7:
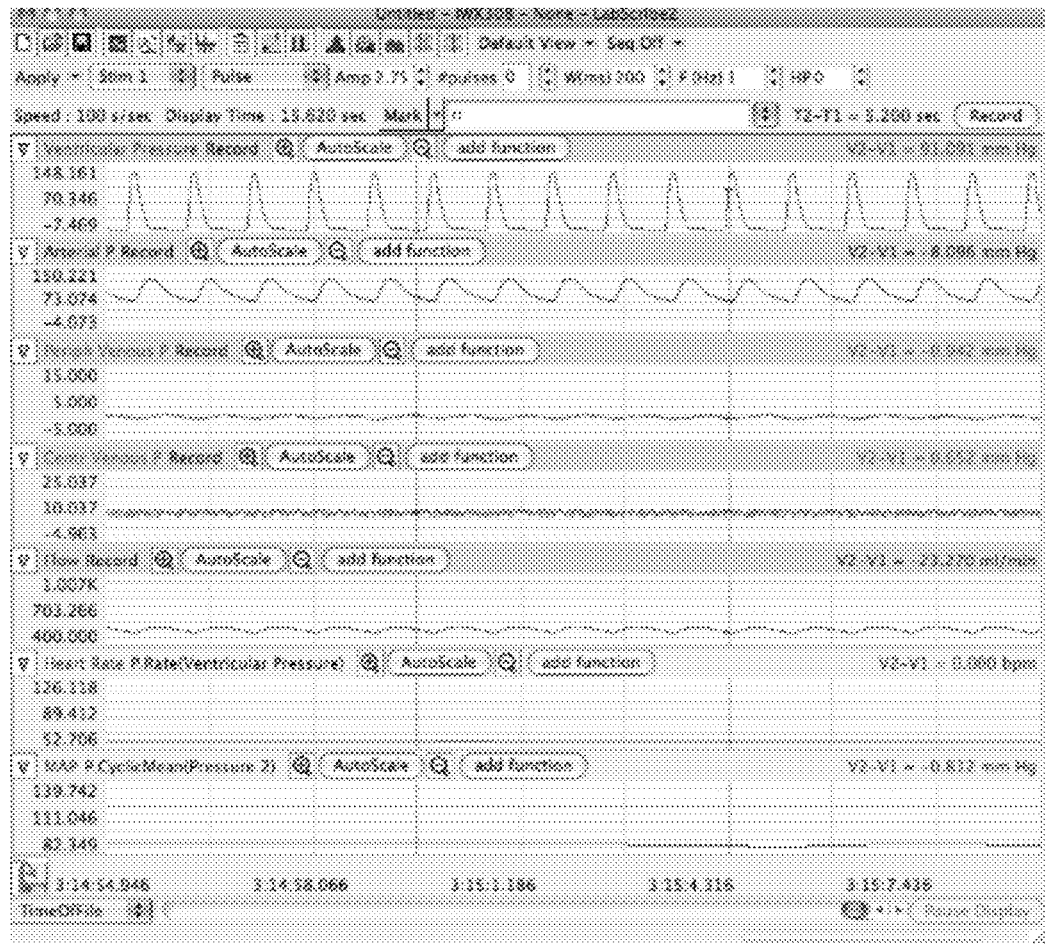
FIG. 7 is a screenshot of some control and out parameters used in operation of the cardiovascular model according to an embodiment of a present invention.

A personal computer is used to operate controllers, which in turn operate various parameters of the subsystem using pressure regulators and compressed air from a compressed air source. In an embodiment of the invention, control of the Fairchild pressure regulators and data acquisition of the pressure transducers and the flowmeter is accomplished with an iMac (2008), AD Instruments Powerlab hardware and Chart Software. An exemplary representation of a graphical user interface is shown in FIG. 7, which shows control parameters of the arterial subsystem and various measured and calculated parameters of the model.

Mean circulatory pressure or basal pressure is modeled by adding liquid to the model. More specifically, the fluid is added to a windkessel. Preferably, graduations are provided on the windkessel to identify a hydrostatic level of fluid in the model. Accordingly, a user measures the liquid level against the graduations, and associates liquid level with the physiological concept of basal pressure, or mean circulatory pressure. Variations and adjustments of the liquid level are made, and the effects may be perceived by recording and viewing pressure measurements taken at various locations along the model. Flow measurements may be recorded and viewed using a flow transducer and the computer. The measurements may be correlated with physiological concepts of the cardiovascular system as discussed herein.

In an embodiment of the invention, basal pressure adjusters are communicatively mounted to the windkessels. The basal pressure adjusters preferably are syringes having a volume that is adjustable based on the position of the plunger within the barrel of the syringe. The volume of the basal pressure adjuster is in communication with its associated windkessel, thereby allowing the volume of the associated windkessel to be finely adjusted according to the position of the plunger within the barrel of the syringe. The model is generally closed relative to atmospheric pressure. In the instance where the model is closed to atmosphere and the basal pressure adjusters are employed, the basal pressure adjusters act to finely modify the pressure at the associated windkessel. Modeling mean circulatory pressure, for example, may be employed by operating the basal adjusters.

Preferably, the basal pressure adjusters are connected to the windkessels with three-way valves. One port of the three-way valve is used to selectively vent the associated windkessel to atmosphere. When an operator slides the sealing lid (for example 1215, 1415, and 1515) of the windkessel, a change in pressure would otherwise result from sliding of the sealing lid. Venting the windkessel to atmosphere while sliding the sealing lid allows the operator to slide the sealing lid without impacting pressure of the windkessel.

The invention embodies a method of illustrating a plurality of physiological concepts and relationships concerning the cardiovascular system including arterial compliance, venous, compliance, and peripheral resistance. Said method of illustration includes making conceptual associations between the physical aspects of the model and the physiological aspects of the cardiovascular system, manipulating of one or more of the various parameters of the subsystems of the model and observing one or more of the various output parameters according to a set of predetermined procedural steps. In some instances, at least one user manually modifies certain parameters of the model. One example includes modifying compliance by changing the location of the sealing lids of the windkessels. Another example includes modifying arterial resistance by opening or closing one or more of the collapsible conduits of the flowpath network. The Appendix to this document entitled "Laboratory 6A—The Cardiovascular Model" is an example of a lab exercise that embodies the inventive method, which is incorporated by reference as if set forth herein in its entirety.

In reference to the cardiovascular model 1000, exemplary scenarios of the inventive method include manipulating one or more parameters of the subsystems of the model and monitoring any changes in measured output parameters from a baseline set of conditions. One scenario concerns manipulating parameters of the subsystems to determine how to increase blood flow to model an exercise condition. Options include increasing heart rate; decreasing peripheral resistance by opening one or more of the collapsible conduits of the flowpath network; modeling a stronger heartbeat, modeling various systole/diastole durations, modeling various rates of breathing/the thoracic pump, and varying the skeletal muscle pump rate.

My invention includes a method of modeling a cardiac cycle with a hydraulic model. The method includes the following steps. A basal fluid pressure of the hydraulic model is set by containing a vertical column of fluid 1002 that is in fluidic communication with the remaining components of the hydraulic model. The fluid 1002 is periodically ejected in a singular direction from a balloon like tubular member through a check valve to an arterial subsystem 1200. As discussed herein, this step is modeled by the cardiac subsystem 1100. The arterial subsystem 1200 buffers fluid pressure by interfacing the fluid 1002 with an arterial windkessel air volume (AWAV) 1211. The fluid 1002 is then routed through a peripheral resistance subsystem 1300 through a check valve 1417 to a peripheral venous (PV) subsystem 1400. The PV subsystem 1400 augments fluid pressure by interfacing the fluid 1002 with a peripheral windkessel air volume (PWAV) 1411. Fluid is then routed from the PV 1400 subsystem through a check valve 1517 to a central venous (CV) subsystem 1500. The CV subsystem 1500 augments fluid pressure by interfacing the fluid 1002 with a central venous windkessel air volume (CVWAV) 1511. The fluid 1002 is then routed from the CV subsystem 1500 through a check valve 1123 to the balloon like tubular member 1005 to complete a flow cycle.

In a preferred embodiment, as discussed herein, the step of periodically ejecting the fluid 1002 includes incasing the balloon like tubular member 1005 in a voidspace 1003 of a sealed cardiac chamber, 1001 for example, and applying and/or releasing air pressure to/from the voidspace 1003 which causes the fluid 1002 to enter the balloon like member 1005 when pressure to the voidspace 1003 is released and to eject the fluid 1002 when pressure to the voidspace 1003 is applied.

The inventive method further includes one or more of the following steps:
 a. conceptually associating "periodically ejecting the fluid 1002" with the beating of a heart moving blood through the cardiovascular system,
 b. conceptually associating "interfacing the fluid with an arterial windkessel air volume (AWAV) 1211" with arterial compliance,
 c. conceptually associating "routing the fluid through a peripheral resistance subsystem 1300" with peripheral resistance,
 d. conceptually associating "augmenting fluid pressure with the PV subsystem 1400" with peripheral venous compliance, and
 e. conceptually associating "augmenting fluid pressure with the CV subsystem 1500" with central venous compliance.

In accordance with my invention, flow rate is conceptually associated with cardiac output. As discussed herein, "augmenting" may include buffering, but is not limited to such. Augmenting may encompass buffering and modulating pressure. The method includes the step of measuring flow rate of the fluid 1002 at a location along the flow cycle. Preferably, the flow transducer 1221 is utilized to sense and translate data concerning flow rate using a computer.

The invention further includes the step of measuring pressure at a plurality of location along the flow cycle. The plurality of locations measured include one or more of:
 a. at a first location between the check valves immediately upstream and downstream of the balloon like tubular member 1005;
 b. at a second location in the voidspace 1003;
 c. at a third location at the AWAV 1211, or downstream of the AWAV 1211 and upstream of the peripheral resistance subsystem 1300;
 d. at a fourth location upstream of the check valve that is located upstream of the PWAV 1411;
 e. at a fifth location at the PWAV 1411, or downstream of the PWAV 1411 and upstream of the check valve that is located upstream of the CVWAV 1511; and
 f. at a sixth location at the CVWAV 1511, or downstream of the CVWAV 1511 and upstream of the check valve that is upstream of the balloon like tubular member 1005.

The pressure measured at the first location and/or the second location is conceptually associated with ventricular pressure. The pressure measured at the third location is conceptually associated with arterial pressure. The pressured measured at the forth location is conceptually associated with capillary pressure. The pressure measured at the fifth location is conceptually associated with peripheral venous pressure. The pressure measured at the sixth location is conceptually associated with venous pressure/cardiac filling pressure.

As discussed herein the step of conceptually associating, or conceptually associated, or associating may occur by lecture in a classroom, from textual materials such as text books, or lecture hand outs, from laboratory procedures, or from generally understanding the physiology of the cardiovascular system.

Arterial compliance is increased and/or decreased by increasing and/or decreasing the AWAV 1211. Measurements are recorded and may include one or more ventricular pressure, arterial pressure, capillary pressure, peripheral venous pressure, and central venous pressure/cardiac filling pressure.

As discussed herein, the peripheral resistance subsystem 1300 includes a plurality of tubes or flow paths connected in parallel. The step of "routing the fluid peripheral resistance subsystem" is conceptually associated with the concept of peripheral resistance. One or more of the plurality of flow paths of the peripheral resistance subsystem 1300 are opened and/or closed. Measurements are recorded before and/or after. Measurements may include one or more ventricular pressure, arterial pressure, capillary pressure, peripheral venous pressure, and central venous pressure/cardiac filling pressure.

The step of "augmenting fluid pressure with the PV subsystem 1400" is conceptually associated with peripheral venous compliance. The modeled venous compliance is then increased and/decreased by increasing and/or decreasing the PWAV 1411. Measurements are recorded and compared. Measurements may include one or more of ventricular pressure, arterial pressure, capillary pressure, peripheral venous pressure, and central venous pressure/cardiac filling pressure.

The step of "augmenting fluid pressure with the CV subsystem 1500" is conceptually associated with central venous compliance. The modeled peripheral venous compliance is increased and/or decreased by increasing and/or decreasing the CVWAV 1511. Measurements are recorded and compared. The following measurements may include one or more ventricular pressure, arterial pressure, capillary pressure, peripheral venous pressure, and central venous pressure/cardiac filling pressure.

The method further includes modeling peripheral venous pumping or skeletal muscle pumping. This is achieved by modulating the pressure of the PWAV 1411. The step of modulating the pressure of the PWAV 1411 is conceptually associated with peripheral venous pumping or skeletal muscle pumping. This action can be perceived by measuring one or more ventricular pressure, arterial pressure, capillary pressure, peripheral venous pressure, and central venous pressure/cardiac filling pressure.

The method includes simulating thoracic pumping or central venous pumping with the model by modulating the pressure of the CVWAV 1511. The modulating step is conceptually associated with thoracic pumping. The thoracic pumping or central venous pumping is then perceived by measuring parameters that may include one or more ventricular pressure, arterial pressure, capillary pressure, peripheral venous pressure, and central venous pressure/cardiac filling pressure.

Figure 8:
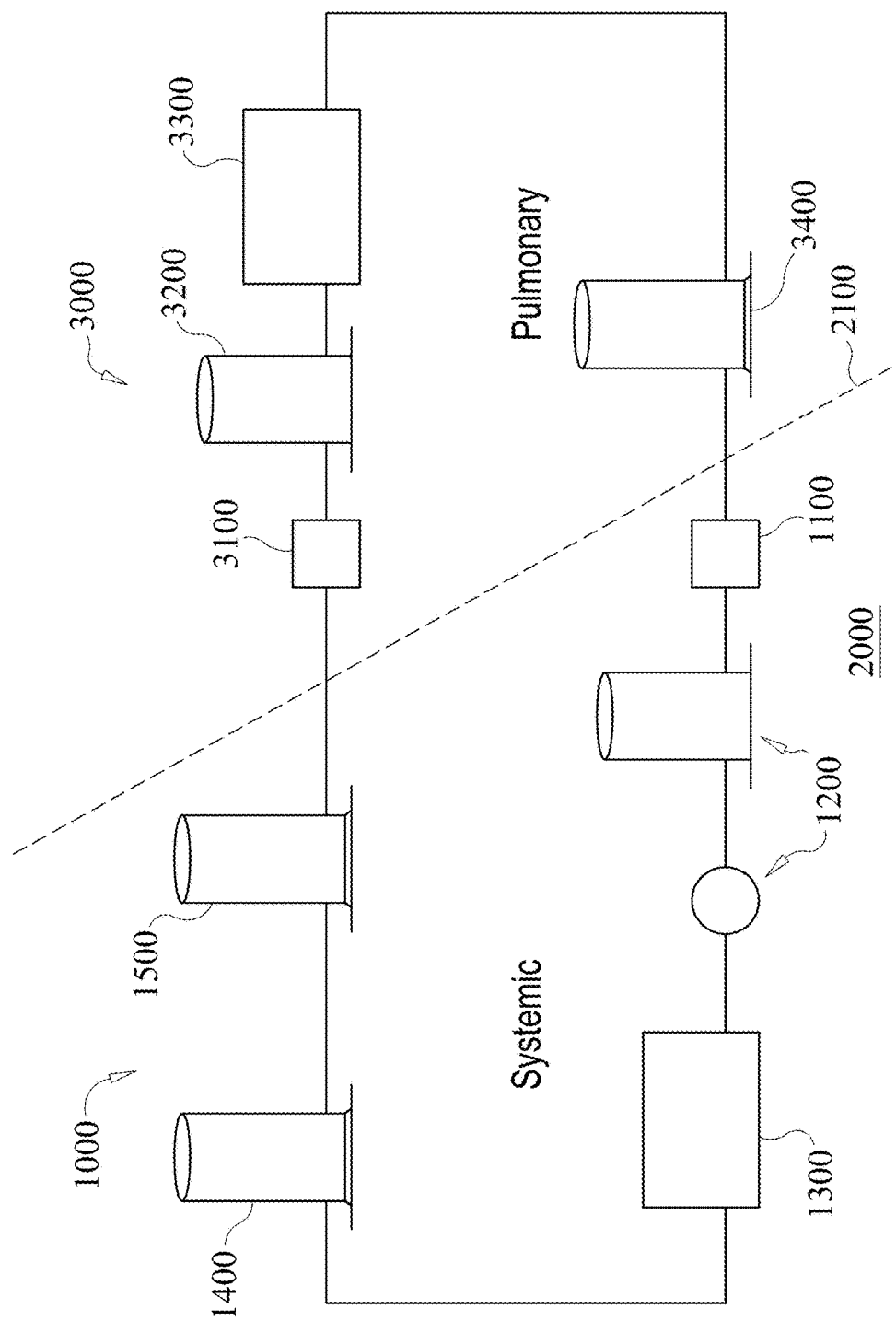
FIG. 8 is a schematic representation of an embodiment of the cardiovascular model showing a dual circuit configuration (pulmonary and systemic circuits).

Turning to FIG. 8, there is shown a schematic representation of a "dual circuit" model 2000. The dual circuit model comprises a systemic circuit 1000 and a pulmonary circuit 3000. The systemic circuit is comprised of the components of the cardiovascular system model 1000, as discussed herein. As shown in FIG. 8, the systemic circuit 1000 and the pulmonary circuit 3000 are schematically divided by the dashed line 2100.

The pulmonary circuit 3000 comprises a right cardiac subsystem 3100 for modeling the right ventricle of the human heart. The right cardiac subsystem 3100 is equipped and configured to operate like the cardiac subsystem 1100 discussed herein. In the dual circuit configuration, the right cardiac subsystem 3100 receives fluid from the central venous (CV) subsystem 1500 and discharges to a pulmonary arterial subsystem 3200. The pulmonary arterial subsystem 3200 models pulmonary arterial compliance and is equipped and configured to operate like (but not identical to) the arterial subsystem 1200 discussed herein. The pulmonary arterial subsystem 3200 discharges into a pulmonary resistance subsystem 3300. The pulmonary resistance subsystem 3300 models pulmonary resistance and is equipped and configured to operate like (but not identical to) the peripheral resistance 1300 subsystem discussed herein. The pulmonary resistance subsystem 3300 discharges into a pulmonary venous subsystem 3400. The pulmonary venous subsystem 3400 models pulmonary venous compliance and is equipped and configured to operate like the peripheral venous subsystem 1400 as discussed herein. In the dual circuit model 2000, the pulmonary venous subsystem 3400 discharges to the cardiac subsystem 1100, also understood as a model of the left ventricle. Although reference to like configurations and operations is made between the subsystems of the pulmonary circuit 3000 and the systemic circuit 1000, it is understood that characteristics such as size, volume, and resistance may vary in order to adequately model the pulmonary circuit 3000.

The dual circuit model 2000 enables a user to model concepts such as right heart failure and/or left heart failure, and to perceive measure and determine the effects of such. For example, the dual circuit model 2000 may be used to show the effects of left heart failure. Using the computer and the controller, the function of the left ventricle modeled by the cardiac subsystem 1100 may be modified by frequency of contraction, strength of contraction (voltage applied to the controller from the computer), and duration of contraction. The effects may be perceived by recording and viewing pressure measurements taken at various locations along the model. This, as well, is accomplished using pressure transducers and a computer. Flow measurements may be recorded and viewed using a flow transducer and the computer. The measurements may be correlated with physiological concepts of the cardiovascular system. Referring to left heart failure, pulmonary venous congestion can be observed as a higher pressure recorded at points along the pulmonary circuit 3000. Concepts such as pulmonary edema and difficulty in breathing are considered and discussed as associated effects of left heart failure.

Similarly, the dual circuit model 2000 may be used to model and show the effects of right heart failure. Using the computer and the controller, the function of the right ventricle modeled by the right cardiac subsystem 3100, may be modified by frequency of contraction, strength of contraction (voltage applied to the controller from the computer), and duration of contraction. The effects may be perceived by recording and viewing pressure measurements taken at various locations along the model. This as well is accomplished using pressure transducers and a computer. Flow measurements may be recorded and viewed using a flow transducer and the computer. The measurements may be correlated with physiological concepts of the cardiovascular system. Referring to right heart failure, systemic venous congestion can be observed as a higher pressure recorded at points along the systemic circuit 1000. Concepts such as peripheral edema are considered and discussed as associated effects of right heart failure.

In a preferred embodiment of the invention, simultaneous computer based control and operation of the cardiac subsystem 1100 and right cardiac subsystem 3100 is as follows. Each of the cardiac subsystem 1100 and right cardiac subsystem 3100 is in communication with a separate Fairchild air flow regulator. The control signal from the computer is split to each Fairchild air flow regulator. Concerning the Fairchild that operates the right cardiac subsystem 3100, a potentiometer is used to modify the control voltage sent from the computer, such that the resulting voltage seen at the right cardiac Fairchild is less. Thus the strength of contraction of the right cardiac subsystem 3100 is less, while frequency of contraction and duration of contraction remain the same. Typically, the mean pressure of the pulmonary circuit 3000 is one fifth that of the pressure of the systemic circuit 1000 because there is less resistance to flow in the pulmonary circuit 3000. Accordingly, less work (strength of contraction) is needed to achieve the same flow rate as the systemic circuit 1000.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

The invention claimed is:

1. A hydraulic model of the cardiovascular system for illustrating a plurality of physiological concepts and relationships including arterial compliance, venous compliance, and peripheral resistance, said model comprising:
   a.) a cardiac subsystem adapted to move a fluid in a singular direction in a closed hydraulic system, the cardiac subsystem including
      at least one chamber wall forming a voidspace within the at least one chamber wall,
      a balloon-like tubular member contained within the voidspace, the tubular member having an upstream opening, and a downstream opening connected by a deformable wall for carrying a fluid,
      a fluid conduit connected to the upstream opening and passing through the chamber wall,
      a fluid conduit connected to the downstream opening and passing through the chamber wall,
      a pressure control port extending through the chamber wall for controlling a pressure in the voidspace with a pressure regulator,
      wherein, at diastole, the pressure in the voidspace is reduced via the pressure regulator, causing the fluid to flow into the upstream opening, and wherein at systole the pressure in the voidspace is increased via the pressure regulator causing the fluid to flow out of the downstream opening;

b.) an arterial subsystem for modeling arterial compliance, the arterial subsystem fluidically coupled with the cardiac subsystem to receive the fluid discharged from the cardiac subsystem;

c.) a peripheral resistance subsystem for modeling peripheral resistance, the peripheral resistance subsystem fluidically coupled with the arterial system to receive the fluid discharged from arterial system;

d.) a peripheral venous (PV) subsystem for modeling peripheral venous compliance and for modeling a peripheral venous pump (PVP), the peripheral venous subsystem fluidically coupled with the peripheral resistance subsystem; and e.) a central venous (CV) subsystem for modeling central venous compliance and for modeling a thoracic pump (TP), the CV subsystem fluidically coupled with the PV subsystem to receive the fluid discharged from the PV subsystem and to pass the fluid to the cardiac subsystem to complete the cardiovascular cycle, wherein the cardiac subsystem, the arterial subsystem, the peripheral resistance subsystem, the PV subsystem, and the CV subsystem are arranged in series, whereby the fluid moves from the cardiac subsystem to the arterial subsystem, from the arterial subsystem to the peripheral resistance subsystem, from the peripheral resistance subsystem to the PV subsystem, from the PV subsystem to the CV subsystem, and from the CV subsystem to the cardiac subsystem.

2. The hydraulic model of claim 1, the arterial subsystem comprising:

i.) an arterial windkessel (AW) for modeling arterial compliance, said AW including:
a reservoir defined by an inlet, and an outlet connected by at least one reservoir wall,
the at least one reservoir wall extending upwardly to an elevation sufficient to contain the fluid and an arterial windkessel air volume (AWAV) located above the fluid,
the at least one reservoir wall forming a rim for receiving a sealing lid for sealably fitting within the at least one reservoir wall and for preventing the AWAV from venting to atmospheric pressure, and
the sealing lid slidably engages the at least one reservoir wall to cause the AWAV to vary according to a selectable vertical location of the sealing lid,
wherein the AWAV compresses and expands in response to a pressure wave of the fluid discharging from the cardiac subsystem, thereby buffering the pressure wave to a degree that correlates with the AWAV;

ii.) an arterial pressure transducer port located at a point downstream from the arterial windkessel for connecting with a pressure transducer for monitoring an arterial pressure of the fluid flowing downstream from the arterial windkessel; and iii.) a flow transducer for measuring the flow rate of the fluid flowing downstream of the arterial windkessel.

3. The hydraulic model of claim 1, the peripheral resistance subsystem including:
a distribution manifolds for receiving the fluid flowing downstream of the arterial subsystem;
a plurality of collapsible conduits for receiving the fluid from the distribution manifold; and
a collection manifold for merging the fluid distributed among the plurality of collapsible conduits and passing the fluid to at least one downstream conduit,
thereby allowing a user to model a range of peripheral resistances to flow by collapsing one or more of the collapsible conduits; and.

4. The hydraulic model of claim 1, the peripheral venous (PV) subsystem comprising:

i.) a peripheral venous windkessel (PVW) for modeling peripheral venous compliance, said PVW including:
a reservoir defined by an inlet, and an outlet connected by at least one reservoir wall,
the at least one reservoir wall extending upwardly to an elevation sufficient to contain the fluid and a peripheral venous windkessel air volume (PVWAV) located above the fluid,
the at least one reservoir wall forming a rim for receiving a sealing lid for sealably fitting within the at least one reservoir wall and for preventing the PVWAV from venting to atmospheric pressure, and
the sealing lid slidably engages the at least one reservoir wall to cause the PVWAV to vary according to a selectable vertical location of the sealing lid,
wherein the PVWAV compresses and expands in response to a pressure wave of the fluid discharging from the at least one downstream conduit of the arterial subsystem, thereby buffering the pressure wave to a degree that correlates with the PVWAV;

ii.) a peripheral venous check valve located upstream of the PVW for preventing the fluid from flowing out of the inlet of the PWAV;

iii.) a PVP control port extending through the at least one reservoir wall of the PVW for modulating a pressure in the PVW with a PVP pressure regulator, wherein the PVP pressure regulator exerts a modulating pressure to the PVWAV, thereby creating a modulated PVP pressure for modeling the PVP; and iv.) a PV transducer port for reading a PV pressure at or near the PVW with a pressure transducer.

5. The hydraulic model of claim 1, the central venous (CV) subsystem comprising:

i.) a central venous windkessel (CVW) for modeling central venous compliance, said CVW including:
a reservoir defined by an inlet, and an outlet connected by at least one reservoir wall,
the at least one reservoir wall extending upwardly to an elevation sufficient to contain the fluid and a central venous windkessel air volume (CVWAV) located above the fluid,
the at least one reservoir wall forming a rim for receiving a sealing lid for sealably fitting within the at least one reservoir wall and for preventing the CVWAV from venting to atmospheric pressure, and
the sealing lid slidably engages the at least one reservoir wall to cause the CVWAV to vary according to a selectable vertical location of the sealing lid,
wherein the CVWAV compresses and expands in response to a pressure wave of the fluid discharging from the at least one downstream conduit of the PV subsystem, thereby buffering the pressure wave to a degree that correlates with the CVWAV;

ii) a central venous check valve located upstream of the CVW for preventing the fluid from flowing out of the inlet of the CWAV;

iii.) a TP control port extending through the at least one reservoir wall of the CVW for modulating a pressure in the CVW with a TP pressure regulator, wherein the TP pressure regulator exerts a TP modulating pressure to the CVWAV, thereby creating a modulated CVP for modeling a TP; and iv.) a CV transducer port for reading a CV pressure at or near the CVW with a pressure transducer.

6. A method of modeling a cardiac cycle with a hydraulic model, comprising the steps of:

setting a basal fluid pressure of the hydraulic model by containing a vertical column of fluid in fluidic communication with the hydraulic model;

periodically ejecting the fluid from a cardiac subsystem in a singular direction from a balloon like tubular member through a check valve to an arterial subsystem;

buffering fluid pressure with the arterial subsystem by interfacing the fluid with an arterial windkessel air volume (AWAV);

routing the fluid through a peripheral resistance subsystem through a check valve to a peripheral venous (PV) subsystem;

augmenting fluid pressure with the PV subsystem by interfacing the fluid with a peripheral windkessel air volume (PWAV);

routing the fluid from the PV subsystem through a check valve to a central venous (CV) subsystem;

augmenting fluid pressure with the CV subsystem by interfacing the fluid with a central venous windkessel air volume (CVWAV); and routing the fluid from the CV subsystem through a check valve to the balloon like tubular member complete a flow cycle, wherein:

a.) the cardiac subsystem is adapted to move a fluid in a singular direction in a closed hydraulic system, the cardiac subsystem including at least one chamber wall forming a voidspace within the at least one chamber wall, a balloon-like tubular member contained within the voidspace, the tubular member having an upstream opening, and a downstream opening connected by a deformable wall for carrying a fluid, a fluid conduit connected to the upstream opening and passing through the chamber wall, a fluid conduit connected to the downstream opening and passing through the chamber wall, a pressure control port extending through the chamber wall for controlling a pressure in the voidspace with a pressure regulator, wherein, at diastole, the pressure in the voidspace is reduced via the pressure regulator, causing the fluid to flow into the upstream opening, and wherein at systole the pressure in the voidspace is increased via the pressure regulator causing the fluid to flow out of the downstream opening, b.) the arterial subsystem is adapted to model arterial compliance, c.) the peripheral resistance subsystem is adapted to model peripheral resistance, d.) the PV is adapted to model peripheral venous compliance and to model a peripheral venous pump, e.) and the CV subsystem is adapted to model central venous compliance and to model a thoracic pump, and wherein the cardiac subsystem, the arterial subsystem, the peripheral resistance subsystem, the PV subsystem, and the CV subsystem are arranged in series, whereby the fluid moves from the cardiac subsystem to the arterial subsystem, from the arterial subsystem to the peripheral resistance subsystem, from the peripheral resistance subsystem to the PV subsystem, from the PV subsystem to the CV subsystem, and from the CV subsystem to the cardiac subsystem.

7. The method of claim 6, wherein the step of "periodically ejecting the fluid" includes encasing the balloon like tubular member in a voidspace of a sealed cardiac chamber, and applying and/or releasing air pressure to/from the voidspace, thereby causing the fluid to enter the balloon like tubular member when pressure to the voidspace is released and to eject the fluid when pressure to the voidspace is applied.

8. The method of claim 6, further including one or more of the following steps:

f. conceptually associating "periodically ejecting the fluid" with the beating of a heart moving blood through the cardiovascular system, g. conceptually associating "interfacing the fluid with an arterial windkessel air volume (AWAV)" with arterial compliance, h. conceptually associating "routing the fluid through a peripheral resistance subsystem" with peripheral resistance, i. conceptually associating "augmenting fluid pressure with the PV subsystem" with peripheral venous compliance, and j. conceptually associating "augmenting fluid pressure with the CV subsystem" with central venous compliance.

9. The method of claim 8, further including the step of measuring flow rate of the fluid at a location along the flow cycle.

10. The method of claim 9, further including the step of associating flow rate with cardiac output.

11. The method of claim 10, further including the step of measuring pressure at a plurality of locations along the flow cycle.

12. The method of claim 11, the plurality of locations measured including one or more of:

g. at a first location between the check valves immediately upstream and downstream of the balloon like tubular member;

h. at a second location in the voidspace;

i. at a third location at the AWAV, or downstream of the AWAV and upstream of the peripheral resistance subsystem;

j. at a fourth location upstream of the check valve that is located upstream of the PWAV;

k. at a fifth location at the PWAV, or downstream of the PWAV and upstream of the check valve that is located upstream of the CVWAV; and l. at a sixth location at the CVWAV, or downstream of the CVWAV and upstream of the check valve that is upstream of the balloon like tubular member.

13. The method of claim 12, further including one or more of the steps of:

m. conceptually associating the first location with ventricular pressure, n. conceptually associating the second location with ventricular pressure, o. conceptually associating the third location with arterial pressure, p. conceptually associating the fourth location with capillary pressure, q. conceptually associating the fifth location with peripheral venous pressure, and r. conceptually associating the sixth location with central venous pressure/cardiac filling pressure.

14. The method of claim 13, further including the steps of:
conceptually associating "interfacing the fluid with an arterial windkessel air volume (AWAV)" with arterial compliance,
increasing and/or decreasing arterial compliance by increasing and/or decreasing the AWAV, and
measuring one or more of ventricular pressure, arterial pressure, capillary pressure, peripheral venous pressure, and central venous pressure/cardiac filling pressure.

15. The method of claim 13, the peripheral resistance subsystem comprising a plurality of flowpaths connected in parallel, and including the steps of:
conceptually associating "routing the fluid through a peripheral resistance subsystem" with peripheral resistance,
opening and/or closing one or more of the plurality of flowpaths, and measuring one or more of ventricular pressure, arterial pressure, capillary pressure, peripheral venous pressure, and central venous pressure/cardiac filling pressure.

16. The method of claim 13, further including the steps of:
conceptually associating "augmenting fluid pressure with the PV subsystem" with peripheral venous compliance,
increasing and/or decreasing peripheral venous compliance by increasing and/or decreasing the PWAV, and
measuring one or more of ventricular pressure, arterial pressure, capillary pressure, peripheral venous pressure, and central venous pressure/cardiac filling pressure.

17. The method of claim 13, further including the steps of:
conceptually associating "augmenting fluid pressure with the CV subsystem" with central venous compliance,
increasing and/or decreasing peripheral venous compliance by increasing and/or decreasing the CVWAV, and
measuring one or more of ventricular pressure, arterial pressure, capillary pressure, peripheral venous pressure, and central venous pressure/cardiac filling pressure.

18. The method of claim 13, further including the steps of:
modulating the pressure of the PWAV, and
conceptually associating the modulating the pressure of the PWAV with peripheral venous pumping or skeletal muscle pumping.

19. The method of claim 13, further including the steps of:
modulating the pressure of the CVWAV, and
conceptually associating the modulating the pressure of the CVWAV with thoracic pumping or central venous pumping.

* * * * *